Patented May 3, 1932

1,856,533

UNITED STATES PATENT OFFICE

FERDINAND BLUM, OF FRANKFORT-ON-THE-MAIN, GERMANY, ASSIGNOR, BY MESNE ASSIGNMENTS, TO WINTHROP CHEMICAL COMPANY, INC., OF NEW YORK, N. Y., A CORPORATION OF NEW YORK

THERAPEUTICALLY VALUABLE SUBSTANCES OF THE THYROID GLAND AND A PROCESS OF PREPARING THEM

No Drawing. Application filed February 20, 1930, Serial No. 430,119, and in Germany February 28, 1929.

The present invention relates to therapeutically valuable substances of the thyroid gland and a process of preparing them.

The correctness of the supposition, that the thyroxine which has been isolated by Kendall and synthesized by Harrington is the most active principle of the thyroid gland, has repeatedly been doubted in recent times. This doubt is based on the fact that it was not possible to obtain by means of thyroxine all of the actions which are caused by means of the natural hormone. The whole action of the thyroid gland was hitherto possessed only by the albuminous preparations prepared from the gland (cf. "Zeitschrift für die gesamte experimentelle Medizin", volume 58, page 624, Koch, "Journal of Biological Chemistry" volume 14, page 101), such as for instance the thyreoglobuline of Oswald, which is the most active preparation hitherto known.

Now my experiments have proved that one succeeds in isolating different albuminous substances and thus in obtaining the most active substances from this product which has been considered by Oswald as a uniform body and called "thyreoglobuline", by proceeding in the following manner: The precipitation is not effected at a time in a single operation by means of a part by volume, equal or more than equal to a part by volume of the aqueous thyroid extract, of a saturated salt solution as it is usually done since Oswald's experiments, but the aqueous thyroid extract is subjected to a fractionated precipitation by means of an equal part by volume in all, of a concentrated aqueous solution of an easily soluble salt capable of salting out albumine. The precipitates thus obtained are filtered, separated by dialysis, from the salts used for the precipitation and from this solution the active substance is then isolated in known manner, for instance by evaporation of the dialysate in vacuo. The precipitation can, for instance, be carried out in such a manner that the aqueous extracts of the thyroid gland are mixed with only small quantities of an ammonium sulfate solution and after each addition of a portion the products precipitated are removed by filtration. The precipitations are preferably effected by means of a saturated ammonium sulfate solution. There can also be used other salts, such as for instance zinc sulfate, dimethylamine hydrochloride, diethylamine hydrochloride, other di-, tri- or tetra-alkyl-ammonium salts and the like, as far as they are easily soluble in water. The hydrogen ion concentration may vary, but it is preferable to work at the concentration which the extracts have.

Comparative tests have proved that, for instance, the second fraction shows about $\frac{1}{4}$–$\frac{1}{3}$ of the effect of thyroxine measured by the metabolism. Since, however, the iodine content of this fraction is only about 1% of that of the thyroxine, the strong effect of this second fraction, considerably increased in comparison with that of the thyroxine when calculated on the same iodine content, is very surprising and it is thus obvious that by my process a new and unexpected result was brought about. But the effect of my products differs also qualitatively from that of the thyroxine, for their influence on the metamorphosis is strongly reduced as compared with that of the thyroxine. They are therefore compounds of a different constitution.

The following examples serve to illustrate the invention, but they are not intended to limit it thereto.

(1) A thyroid solution, obtained in the usual manner, for instance by using 30 liters of water for 15 kilos of glands, is mixed, after its hydrogen ion concentration has been determined, with a saturated ammonium sulfate solution of the same hydrogen ion concentration in the proportion of 45 parts by volume upon 100 parts by volume of thyroid solution, and the precipitate formed is separated and thrown away. To the clear filtrate is added so much of ammonium sulfate solution, that 60 parts by volume of ammonium sulfate solution are present for 100 parts of parent extract. After having again removed the precipitate, the concentration of the ammonium sulfate in the filtrate is increased to 80 parts of saturated salt solution calculated upon 100 parts by volume of parent solution. The precipitates thus obtained are freed from the ammonium sulfate by dialysis and from the solutions thus purified the active substances are isolated in known manner, for instance, by evaporation of the dialysate in vacuo.

(2) 20 kilos of thyroid glands are extracted for several hours below room temperature by means of 40 liters of water. By percolating a turbid juice is obtained which is clarified by centrifuging. This juice is precipitated by means of neutral saturated ammonium sulfate solution. There are first added, according to the result of a preliminary trial, 40-45 parts of ammonium sulfate solution to 100 parts of extract and the precipitate formed is removed and thrown away. The concentration of the salt solution in the filtrate is so much increased that for 60 parts by volume of saturated ammonium sulfate solution 100 parts of parent solution are present. The precipitate thus obtained is purified by dialysis, re-dissolved in water and precipitated as above, the precipitate purified by dialysis and the dialysate evaporated as above. In the filtrate of the precipitate obtained with 60 parts by volume of saturated ammonium sulfate solution on 100 parts of parent extract, only less active portions of the albumine remain.

(3) 5 kilos of frozen sheep thyroid glands are ground and extracted, while stirring, for some hours with 10 liters of water of about 10° C. The extract is purified by percolating and centrifuging and mixed with saturated zinc sulfate solution until the formation of a precipitate sets in. This first precipitate is removed, thrown away and then zinc sulfate is again added, so that now 100 parts of parent solution are present for 70 parts of zinc sulfate solution, and the precipitate is isolated. Products which are less active and poor in iodine remain in the filtrate. After washing, dialysis and precipitation the substance is dried.

(4) 20 kilos of thyroid glands of pigs are extracted as above indicated by means of 40 liters of water, and then with 20 liters of water at a temperature below 15° C. The extracts are mixed with a solution of dimethylamine hydrochloride in water in the proportion of 4:1 in such a manner that first 20 parts of solution are added to 100 parts of extract. The small precipitate is removed, thrown away and then so much of the hydrochloride solution is added to the filtrate that 60 parts of the concentrated solution of dimethylamine hydrochloride are present for 100 parts of parent extract. The fraction thus obtained of the thyreoglobuline is isolated.

(5) 20 kilos of thyroid glands of cattle are extracted by means of water containing sodium chloride as indicated in Example 3 and mixed with a concentrated solution of diethylamine hydrochloride. The precipitate, which is obtained by addition of 20-25 parts of the hydrochloride solution, is removed, thrown away, to the filtrate is added such a quantity of the concentrated hydrochloride solution, that 70 parts of concentrated solution are present for 100 parts of parent extract. The precipitate is purified and dried as above indicated.

The substances obtained according to the above examples are albuminous bodies having the character of an iodine-albumose, whose iodine-content amounts to 0.6-0.8%. They are soluble in pure water in a colloidal form and yield for instance in a 1% concentration a feebly greenish solution. Their activity, when tested on animals, is about 1/3 of the equal weight of thyroxine, so that, therefore, the small iodine-content is considerably more active. They distinguish from the thyreoglobuline obtained acording to Oswald, by the iodine-content which amounts to only about 0.4% in the latter product.

I claim:

1. In the process of preparing therapeutically active substances from the thyroid gland, the steps which comprise; (a) subjecting an aqueous thyroid solution to a fractional precipitation by means of a concentrated aqueous solution of an easily water-soluble salt, capable of salting out albumins, selected from the group consisting of ammonium-sulfate, zinc-sulfate, dimethyl-amino-hydrochloride and diethylamino-hydrochloride, the whole amount by volume of which solution does not exceed the quantity by volume of the thyroid solution, and said fractional precipitation carried out by adding at least twice to the aqueous thyroid solution fractional amounts by volume of the said concentrated salt solution; (b) working up each of the precipitation products thus obtainable, beginning with the second precipitate, by means of filtration, dialysation and evaporation of the dialysate in vacuo.

2. In the process of preparing therapeutically active substances from the thyroid gland, the steps which comprise subjecting an aqueous thyroid solution to a fractional precipitation by means of a concentrated aqueous solution of an easily water-soluble salt, capable of salting out albumins, selected from the group consisting of ammonium-sulfate, zinc-sulfate, dimethyl-amino-hydrochloride and diethylamino-hydrochloride, the whole amount by volume of which solution does not exceed the quantity by volume of the thyroid solution, and said fractional precipitation carried out by adding first to the aqueous thyroid solution an amount of 45% by volume of said concentrated salt solution, filtering the precipitate thus obtained which is thrown away, and subjecting the filtrate at least once more to the treatment causing precipitation by adding each time about 15% by volume of the same salt solution, filtering off the product precipitated by each addition and working up the precipitates in equal manner by dialysation and evaporation of the dialysate in vacuo.

3. In the process of preparing therapeutically active substances from the thyroid gland, the steps which comprise subjecting an aqueous thyroid solution to a fractional precipitation by means of a concentrated aqueous solution of ammonium-sulfate, the whole amount by volume of which solution does not exceed the quantity by volume of the thyroid solution, and said fractional precipitation carried out by adding first to the aqueous thyroid solution an amount of 45% by volume of said concentrated salt solution, filtering the precipitate thus obtained which is thrown away, and subjecting the filtrate twice to the treatment causing precipitation by adding each time about 15% by volume of the same salt solution, filtering off the product precipitated by each addition and working up the precipitates in equal manner by dialysation and evaporation of the dialysate in vacuo.

4. In the process of preparing therapeutically active substances from the thyroid gland, the steps which comprise subjecting an aqueous thyroid solution to a fractional precipitation by means of a concentrated aqueous solution of ammonium-sulfate, the whole amount by volume of which solution does not exceed the quantity by volume of the thyroid solution, and said fractional precipitation carried out by adding first to the aqueous thyroid solution an amount of 45% by volume of said concentrated salt solution, filtering the precipitate thus obtained which is thrown away, and subjecting the filtrate once to the treatment causing precipitation by adding about 15% by volume of the same salt solution, filtering off the product precipitated by the addition and working up the precipitate by dialysation and evaporation of the dialysate in vacuo.

5. As new products, the therapeutically active substances of the thyroid gland obtainable by the process of claim 3, said new products being albuminous substances, having the character of an iodine albumin, and having an iodine content of 0.6 to 0.8%, and being soluble in pure water in a colloidal form, yielding thereby in 1% concentration a feebly greenish solution, their activity, when tested on animals, being about one third of the equal weight of thyroxine.

6. As a new product, the therapeutically active substance of the thyroid gland obtainable according to the process of claim 4, said new product being an albuminous substance having the character of an iodine albumin, and having an iodine content of about 1% of that of thyroxine, showing about one fourth to one third of the effect of thyroxine measured by metabolism, and being soluble in pure water in a colloidal form, thereby yielding in 1% concentration a feebly greenish solution.

In testimony whereof, I affix my signature.

FERDINAND BLUM.